(12) United States Patent
Zakin et al.

(10) Patent No.: US 11,809,219 B2
(45) Date of Patent: Nov. 7, 2023

(54) SYSTEM IMPLEMENTING MULTI-THREADED APPLICATIONS

(71) Applicant: DRIVENETS LTD., Raanana (IL)

(72) Inventors: Ori Zakin, Sde Varburg (IL); Amir Krayden, Hertzelia (IL); Or Sadeh, Pardes-Hanna (IL); Yuval Lev, Gan Yavne (IL)

(73) Assignee: DRIVENETS LTD., Raanana (IL)

( * ) Notice: Subject to any disclaimer, the term of this patent is extended or adjusted under 35 U.S.C. 154(b) by 375 days.

(21) Appl. No.: 17/256,526

(22) PCT Filed: Jun. 18, 2019

(86) PCT No.: PCT/IL2019/050682
§ 371 (c)(1),
(2) Date: Dec. 28, 2020

(87) PCT Pub. No.: WO2020/008449
PCT Pub. Date: Jan. 9, 2020

(65) Prior Publication Data
US 2021/0279096 A1    Sep. 9, 2021

Related U.S. Application Data

(60) Provisional application No. 62/692,912, filed on Jul. 2, 2018.

(51) Int. Cl.
*G06F 9/48* (2006.01)

(52) U.S. Cl.
CPC ................. *G06F 9/4881* (2013.01)

(58) Field of Classification Search
CPC .................................. G06F 9/4881
See application file for complete search history.

(56) References Cited

U.S. PATENT DOCUMENTS

| 6,505,229 | B1 | 1/2003 | Turner et al. |
| 7,234,139 | B1 | 6/2007 | Feinberg |
| 2006/0206902 | A1 | 9/2006 | Jamil et al. |

(Continued)

FOREIGN PATENT DOCUMENTS

| AU | 2007200660 A1 | 3/2007 |
| EP | 2549377 A2 | 1/2013 |
| EP | 3639147 | 12/2018 |

*Primary Examiner* — Wissam Rashid
(74) *Attorney, Agent, or Firm* — Browdy and Neimark, PLLC

(57) ABSTRACT

A method for executing instructions embedded in two threads stored in a system including two operating units and a virtual managing entity for holding queues for virtual objects (VO) waiting to use a respective operating unit and diverting them between queues. Each VO is associated with two virtual timers, one measuring a time period during which the VO is held in the queue (TIQ) and the other providing time period during which the VO will remain in an alive state (TTL). The method includes receiving information relating to VOs associated with the two threads; operating on VOs for which their TTLs have expired; upon emerging from its respective queue, determining whether each VO should be diverted to another queue; upon diverting the VO, resetting its TIQ timer; and allocating an access time to each VO based on a number of threads requiring that VO and the TIQ associated therewith.

6 Claims, 3 Drawing Sheets

(56) References Cited

U.S. PATENT DOCUMENTS

| | | | |
|---|---|---|---|
| 2007/0220517 A1* | 9/2007 | Lippett | G06F 9/5038 718/102 |
| 2008/0109809 A1 | 5/2008 | Morishita et al. | |
| 2017/0010925 A1 | 1/2017 | Nitta et al. | |
| 2018/0246720 A1* | 8/2018 | Khaleque | G06F 9/30021 |

* cited by examiner

SYSTEM IMPLEMENTING MULTI-THREADED APPLICATIONS

TECHNICAL FIELD

The present disclosure generally relates to the field of computer systems. More particularly, the present disclosure relates to systems implementing multi-threaded applications.

BACKGROUND

A thread of execution is the smallest sequence of programmed instructions that can be managed independently by a scheduler, which is typically a part of an operating system. The implementation of threads and processes differs between operating systems, but in most cases a thread is a component of a process. Multiple threads can exist within a single process, while being executed concurrently and sharing resources such as memory, whereas other processes do not share these resources. In particular, the threads of a process are configured to share its executable code and the values of its variables at any given time.

Systems having a single processor, generally implement multi-threading by time slicing: the central processing unit (CPU) switches between different software threads. The switching generally occurs often and rapidly enough so that users perceive the threads or tasks as running in parallel. In a multiprocessor or in a multi-core system, multiple threads can be executed in parallel, with each processor or core executing a separate thread, simultaneously with the others.

Multi-threading is mainly found in multitasking operating systems. It is a programming and execution model that allows multiple threads to co-exist within the context of a single process. These threads share the process' resources, yet they can be executed independently. The threaded programming model provides developers with a useful abstraction of concurrent execution.

Operating systems schedule threads either preemptively or cooperatively. On multi-user operating systems, preemptive multi-threading is the more widely used approach as it has a finer grained control over execution time via context switching. However, as preemptive scheduling still might switch threads at moments that were not anticipated by programmers, thereby causing lock convoy, priority inversion, or other unwanted effects. In contrast, cooperative multi-threading relies on threads to relinquish control of execution thus ensuring that threads would run till completed. This can create problems if a cooperatively multi-tasked thread blocks need to wait for an available resource or if it starves other threads by preventing them from gaining control of execution during intensive computation.

Processors in embedded systems, which have higher requirements for real-time behaviors, might support multi-threading by decreasing the thread-switching time, possibly by allocating a dedicated register file for each thread, instead of utilizing a common register file.

Multi-threaded applications have typically the following advantages:
Responsiveness: multi-threading allows an application to remain responsive to inputs. In a one-thread program, if the main execution thread blocks are occupied with a long-running task, the entire application might appear to be frozen. By moving such long-running tasks to a working thread that runs concurrently with the main execution thread, it becomes possible for the application to remain responsive to user input while executing tasks in the background.
Faster execution: this advantage of a multi-threaded program allows the latter to operate faster on computer systems that have multiple CPUs, systems that have one or more multicore processors, or across a cluster of machines, because the threads of the program naturally lend themselves to parallel execution, assuming that they do not need to wait for each other.
Lower resource consumption: using threads, an application can serve concurrently a plurality of clients using fewer resources than it would otherwise need when using multiple process copies.
Better system utilization: A file system using multiple threads can achieve for example higher throughput and lower latency, since data in a faster medium (e.g. a cache memory) can be retrieved by one thread while another thread retrieves data from a slower medium (e.g. from an external storage) with neither thread having to wait for the other to complete its task.
Simplified sharing and communication: unlike processes which require a message forwarding or a shared memory mechanism to perform inter-process communication (IPC), threads can communicate through data, code and files they already share.
Parallelization: applications used in multicore or multi-CPU systems, can use multi-threading to split data and tasks into parallel subtasks and let the underlying architecture manage how the threads would run, either concurrently on one core or in parallel on multiple cores. Yet, multi-threading has the following drawbacks:
Thread crashes of a process: an illegal operation performed by a thread would crash the entire process. Consequently, one erroneous thread might disrupt the processing of all the other threads associated with the application.
Synchronization: since threads share the same address space, one must be careful to avoid racing conditions and other non-intuitive behaviors. In order for data to be correctly manipulated, threads will often need to synchronize in time in order to process the data at the correct order. Threads may also require mutual exclusivity in operations in order to prevent shared data from being simultaneously modified or read while being modified. Careless use might lead to deadlocks, livelocks or races for resources.

In addition, one of the obstacles that hinders performance in multi-threaded applications is the need to share data blocks/structures between threads. Sharing them in a safe manner, typically requires the use of locks which solve the problems associated with the operational aspect but imposes a substantial degradation of the system performance. Traditionally, locks are implemented by using a timer mechanism that consists of two operations, namely, resetting the timer and moving an item to the back of the queue.

Several attempts were made in the art to improve performance of systems using multi-threads.

U.S. Pat. No. 6,112,222 teaches the use of hybrid lock and unlock capabilities for a threaded computing environment. The hybrid approach determines which lock scheme to employ, by evaluating whether one thread or multiple threads concurrently desire a resource lock. When only one thread desires the lock, the thread is directly assigned resource ownership employing one of an operating system primitive lock process or a hardware lock process. An alternate lock process is used to obtain resource ownership when multiple threads concurrently desire the lock.

U.S. Pat. No. 7,209,918 teaches the use of an apparatus and methods for locking objects in a multi-threaded environment. An example method permits a first thread to lock an object to exclusively execute at least a portion of a routine associated with the object. The method includes, if the object is owned by a second thread, locking the object via an atomic execution and assigning ownership of the object to the first thread. It also includes, if the object is owned by the first thread, locking the object without an atomic execution.

U.S. Pat. No. 7,748,001 discloses a method, apparatus and system used for assigning priority to a thread when the thread is otherwise unable to proceed with instruction retirement. For example, the thread is one of a plurality of active threads in a multiprocessor system that includes memory live-lock breaker logic and/or starvation avoidance logic.

However, moving an item to the back of the queue with multiple updaters requires a lock on the entire queue, which in turn results in all threads having to wait in a queue trying to update a timer, a fact which has an adverse effect on the system performance.

The present invention seeks to provide a solution to the above problem.

SUMMARY

The disclosure may be summarized by referring to the appended claims.

It is an object of the present disclosure to provide a lockless timers' system and a method, that allow updating timers associated with multi-threads without using locks.

It is another object of the present disclosure to provide a system and a method, which tailor a queue management strategy according to the application use case, thereby allowing efficient management of timers with minimal number of queues.

Other objects of the present disclosure will become apparent from the following description.

According to a first embodiment, there is provided a method of executing instructions embedded in at least two threads stored in a processor system comprising at least two operating units and a virtual managing entity configured to hold a plurality of queues for virtual objects waiting to use a respective operating unit, wherein the virtual managing entity is further configured to divert virtual objects from one of the queues to one other of the queues, wherein each virtual object when held in one of said queues is associated with two virtual timers for dynamically tracking time periods linked to that virtual object, one being a virtual timer configured to measure a period of time during which the virtual object is being held in the queue (TIQ) whereas the other one of the two virtual timers is configured to provide a period of time during which the virtual object will remain in an alive state (TTL), the method comprises the steps of:

receiving by the virtual managing entity information that relates to virtual objects associated with the least two threads;

operating on virtual objects which their respective TTLs have expired;

upon emerging from its respective queue, determining whether each virtual object should be diverted by said virtual managing entity to another one of the plurality of queues, and if in the affirmative, the virtual object would be diverted by the virtual managing entity to a queue having a largest timeout value which is smaller than the value of the TTL associated with the respective virtual object;

resetting the virtual timer configured to measure a period of time during which the virtual object is being held in the queue (TIQ); and allocating an access time to each virtual object upon emerging from its respective queue, wherein the access time is determined based on a number of threads for which the virtual object is required and the TIQ associated with that respective virtual object.

By yet another embodiment, the step of operating on virtual objects that their TTLs have expired, comprises discarding these virtual objects from their respective queues.

In accordance with another embodiment, the method further comprising a step of updating the access time for each virtual object, based on updates received from each of the at least two threads, wherein these updates provide information regarding time at which the virtual object was last accessed by the respective updating thread.

By yet another embodiment, the TTL associated with each respective virtual object is calculated upon emerging of the virtual object from its respective queue.

In accordance with another embodiment, the step of discarding virtual objects that their respective TTLs have expired, from their respective queues, is carried out by the virtual managing entity in accordance with said virtual objects' time of entering their respective queues.

According to still another embodiment, the virtual managing entity is further configured to manage the at least two operating units while retaining a minimal number of queues.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention. The scope of the invention can be summarized by referring to the appended claims.

Figure 1:
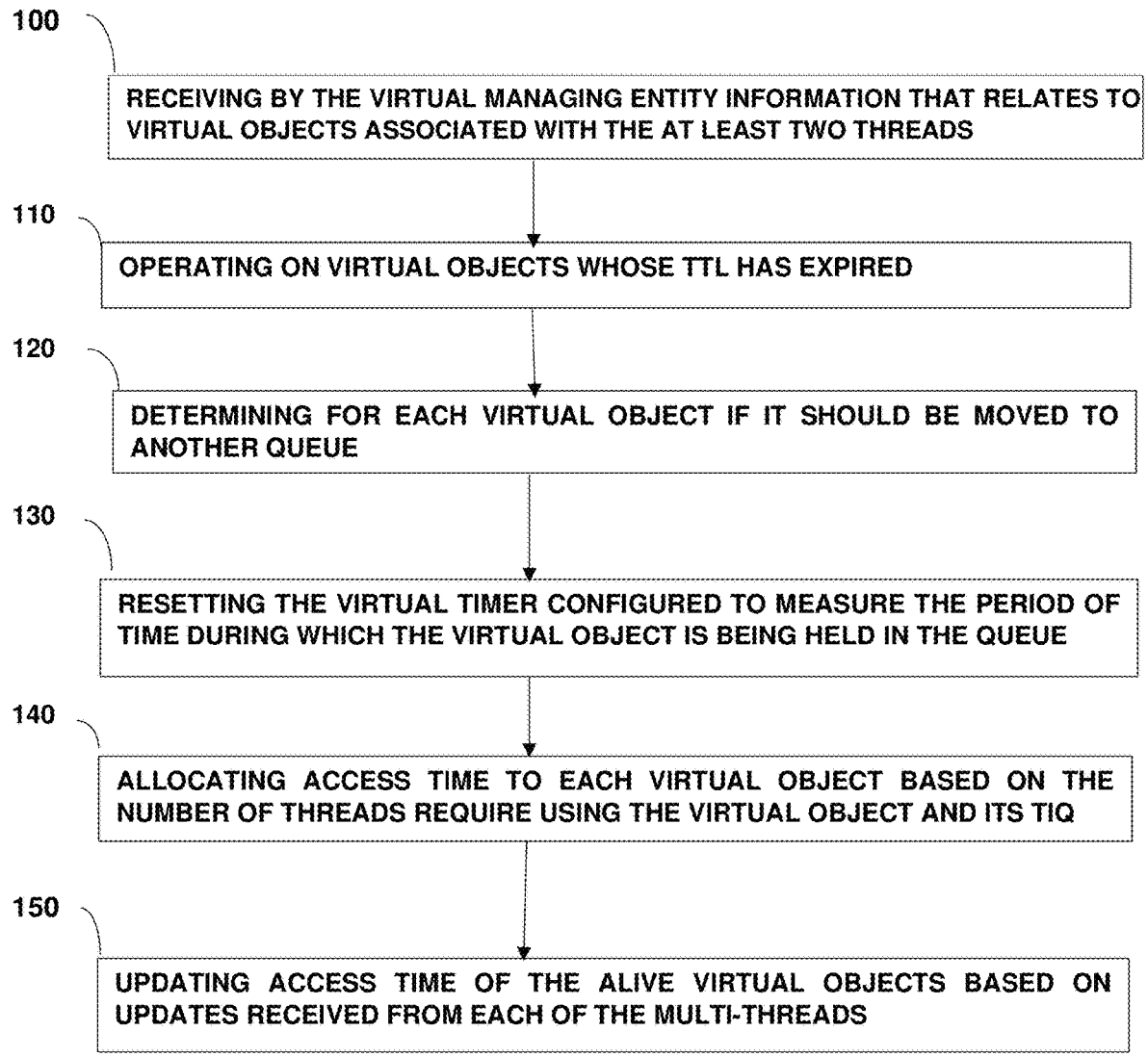
FIG. 1 illustrates a flow chart of a method exemplifying an embodiment construed in accordance with the present invention.

FIG. 1 exemplifies a method construed in accordance with an embodiment of the present invention. According to this example, a system is provided for executing instructions embedded in multi-threads associated with a processor system, wherein the system comprises at least two operating units and a central virtual managing entity holding a plurality of queues of virtual objects waiting to use resources of a respective operating unit. The central virtual managing entity is configured to enable diverting virtual objects from one of the queues to another queue.

Each virtual object comprised in one of these queues is associated with two virtual timers for dynamically tracking time periods linked with the virtual object. One of the two virtual timers is configured to measure a period of time during which the virtual object is held in the queue (TIQ) while the other virtual timer is configured to provide a period of time remaining for that virtual object to remain in an alive state (TTL).

The method exemplified herein comprises receiving by the central virtual managing entity information that relates to virtual objects associated with the at least two threads (step 100).

Next, the virtual managing entity is configured to operate on (e.g. discard) virtual objects that their respective TTL has already expired (step 110).

Upon emerging from its respective queue, it is determined for each virtual object whether the virtual managing entity should divert it to another one of the queues, wherein a virtual object would be moved by the virtual managing entity to a queue having a largest timeout value which is smaller than the value of the TTL associated with the respective virtual object (step 120).

Preferably, if the value of TIQ is smaller than the value of the queue timeout, then the current queue does not need to be analyzed until the next time slice is reached.

Once the virtual object has been diverted, the virtual timer which is configured to measure the period of time during which that virtual object is held in the queue, is reset (step 130).

The central virtual managing entity (or any other applicable entity as the case may be) then allocates an access time to each virtual object upon emerging from its respective queue, and the access time is determined based on a number of threads for which the virtual object is required and the TIQ associated with that virtual object (step 140).

The access time for each of the alive virtual objects is updated by the virtual managing entity, based on updates received from each of the multi-threads (whichever is applicable to that object), wherein these updates provide information regarding time at which the virtual object was last accessed by the respective updating thread from among the multi-threads (step 150).

Let us assume now for the sake of illustrating the method, that we use a power of 2 strategy for the plurality of queues described above (i.e. 1-2-4-8-16-32-64-128-256-512-1024-2048-4096-8192, 16384, 32768 seconds), that means that by applying 16 queues according to the solution provided by the present invention, one is able to implement queues of 1 sec resolution each, which would last up to 9 hours.

Figure 2:
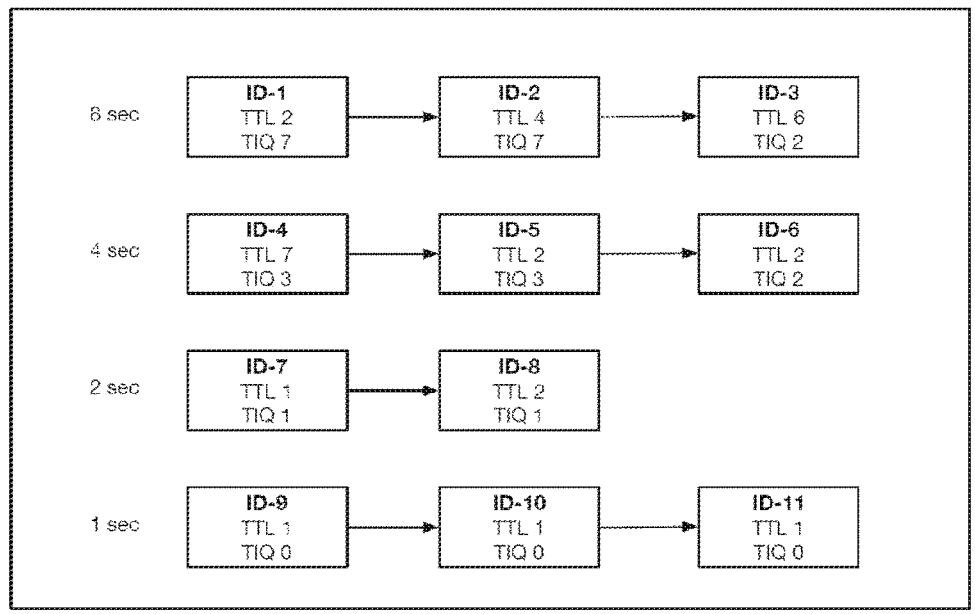
FIG. 2 illustrates an example showing a snap-shot of queues of virtual objects using a power of 2 strategy for implementing these queues.

FIG. 2 illustrates an example showing a snap-shot at a given time of queues using such a power of 2 strategy for implementing these queues, where TIQ is normalized for the sake simplicity. As may be seen in this FIG., for the queues that are used a power of 2 strategy is implemented, i.e. 1-2-4-8 seconds, and the TIQs and TTLs associated with each of the virtual objects comprised in each of these queues is demonstrated in this FIG.

The various virtual blocks are designated in this FIG. 2 by ID-1 to ID-11. For the same of simplicity, the virtual timer which is configured to measure the period of time during which the virtual object is being held in a queue, has been normalized.

Figure 3:
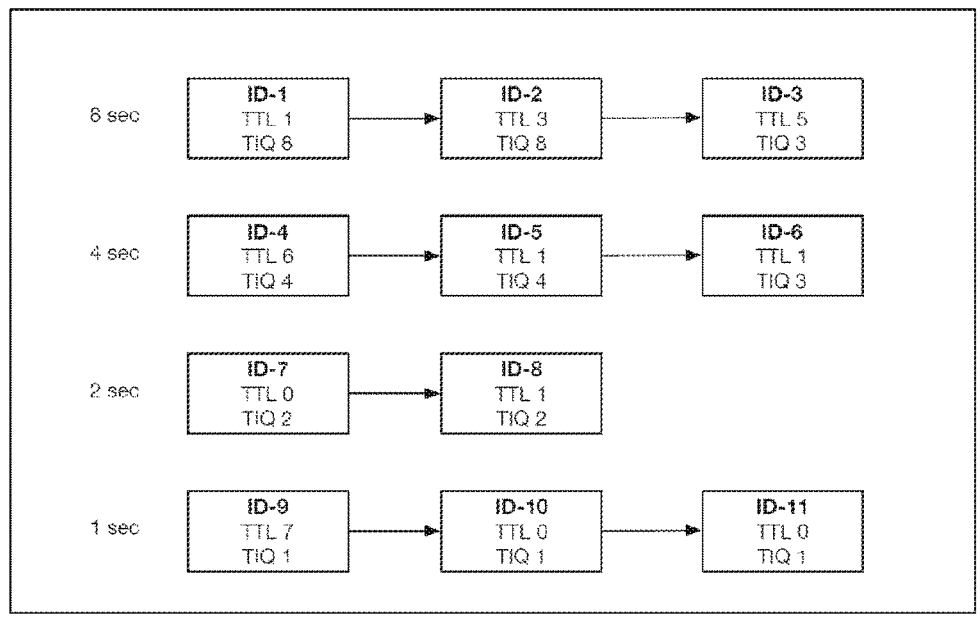
FIG. 3 exemplifies changes that occur in the queues of the virtual objects after one second has elapsed.

FIG. 3 exemplifies changes that occur with each of the virtual objects demonstrated in FIG. 2, after one second has elapsed.

Figure 4A:
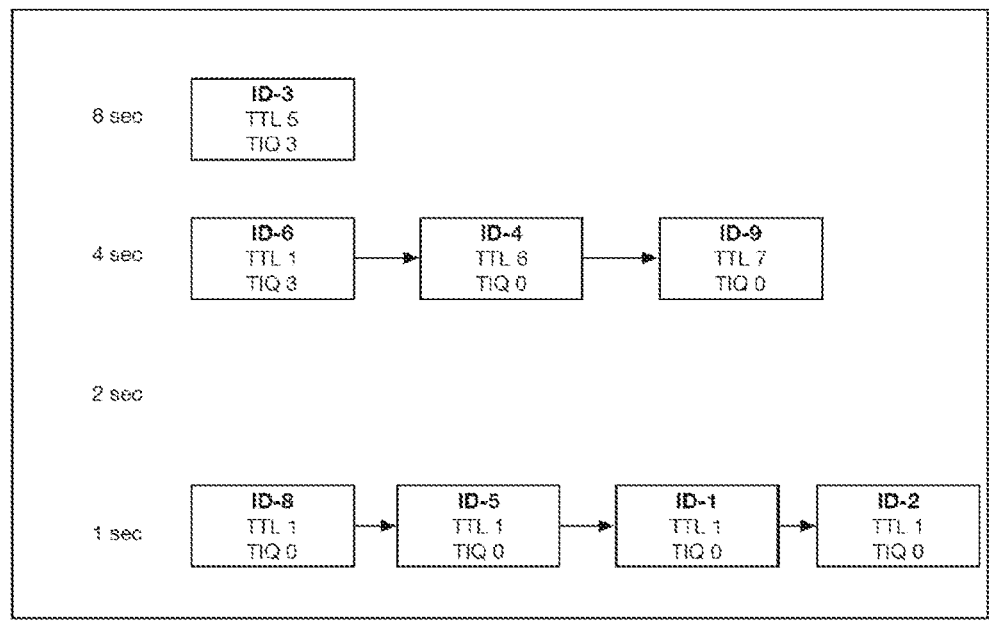
FIG. 4A exemplifies actions taken by the virtual central managing entity by moving virtual objects in the queues in order to reach the configuration described in FIG. 3.
Figure 4B:
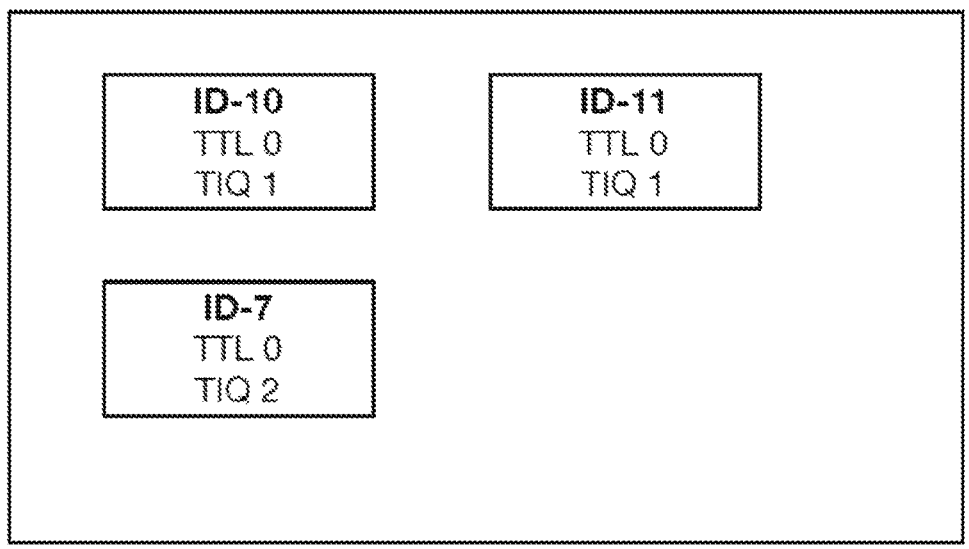
FIG. 4B demonstrates discarding actions taken by the virtual central managing entity thereby reaching the configuration described in FIG. 3.

FIGS. 4A and 4B demonstrate actions taken by the virtual managing entity in connection with the queues exemplified in FIG. 2, in order to reach the state demonstrated in FIG. 3.

FIG. 4A demonstrates moving of certain virtual objects from one queue to another, where the diversion that was done may be observed by following the virtual blocks' IDs, whereas FIG. 4B demonstrates the virtual blocks (ID-10, ID-11 and ID-7) that were discarded by the central virtual managing entity.

Other embodiments of the invention will be apparent to those skilled in the art from consideration of the specification and practice of the invention disclosed herein. It is intended hat the specification and examples be considered as exemplary only, with a true scope and spirit of the invention being indicated by the following claims.

What is claimed is:

1. A method of executing instructions embedded in at least two threads stored in a processor system comprising at least two operating units and a virtual managing entity configured to hold a plurality of queues for virtual objects waiting to use a respective operating unit, and wherein said virtual managing entity is further configured to divert virtual objects from one of the queues to one other of the queues,
    wherein each virtual object when held in one of said queues is associated with two virtual timers for dynamically tracking time periods linked to said virtual object, one being a virtual timer configured to measure a period of time during which said virtual object is being held in the queue (TIQ) whereas the other one of said two virtual timers is configured to provide a period of time during which said virtual object will remain in an alive state (TTL), said method comprising the steps of:
    receiving by the virtual managing entity information that relates to virtual objects that are associated with the at least two threads;
    operating on virtual objects which their respective TTLs have expired;
    upon emerging from its respective queue, determining whether each virtual object should be diverted by said virtual managing entity to another one of said plurality of queues, and if in the affirmative, said virtual object would be diverted by the virtual managing entity to a queue having a largest timeout value which is smaller than the value of the TTL associated with the respective virtual object;
    resetting the virtual timer configured to measure a period of time during which the virtual object is being held in the queue (TIQ); and
    allocating an access time to each virtual object upon emerging from its respective queue, wherein said access time is determined based on a number of threads requiring said virtual object and the TIQ associated with said respective virtual object.

2. The method of claim 1, further comprising a step of updating the access time for each virtual object, based on updates received from each of the at least two threads, and wherein said updates provide information regarding time at which said virtual object was last accessed by the respective updating thread.

3. The method of claim 1, wherein the TTL associated with each respective virtual object is calculated upon emerging of the virtual object from its respective queue.

4. The method of claim 1, wherein the step of operating on virtual objects that their TTL has expired, comprises discarding these virtual objects from their respective queues.

5. The method of claim 1, wherein the step of operating on virtual objects that their TTL has expired from their respective queues, is carried out by said virtual managing entity in accordance with said virtual objects' time of entering their respective queues.

6. The method of claim 1, wherein the virtual managing entity is further configured to manage the at least two operating units while retaining a minimal number of queues.

* * * * *